Dec. 13, 1938.    G. W. HIPSLEY    2,140,229
INDICATING DEVICE FOR VEHICLE LIGHTS
Filed Feb. 5, 1935    3 Sheets-Sheet 1
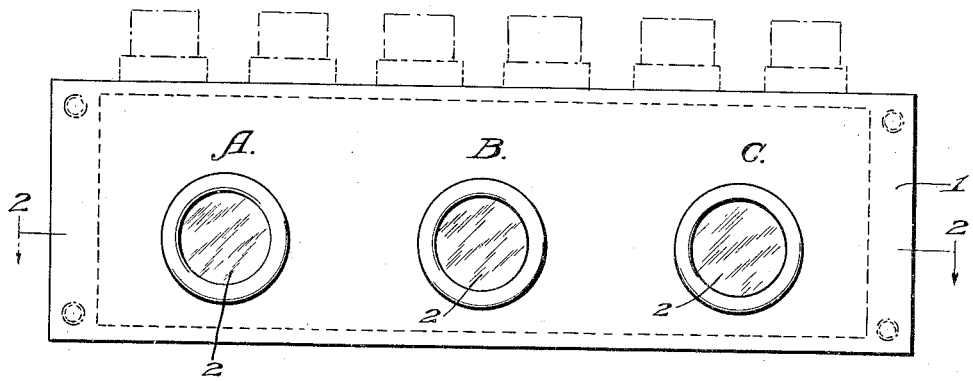
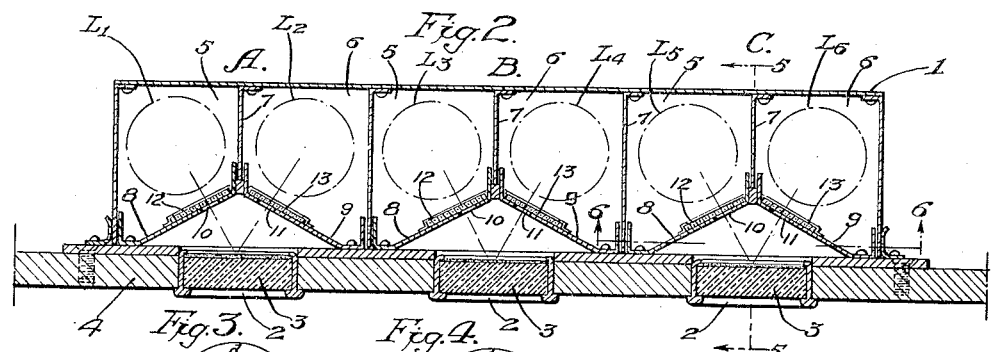
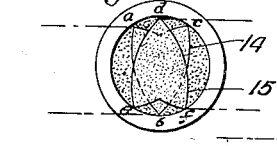
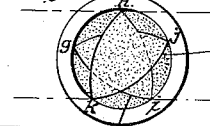
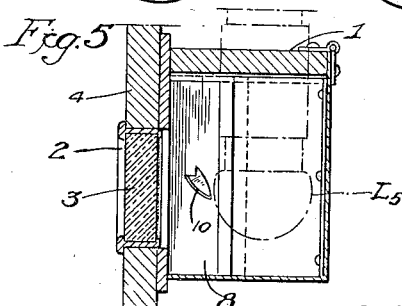
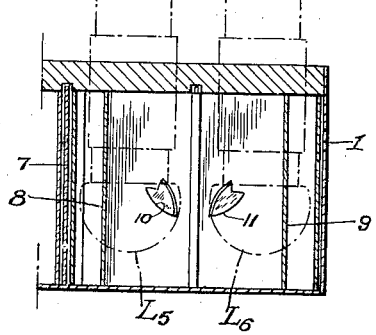
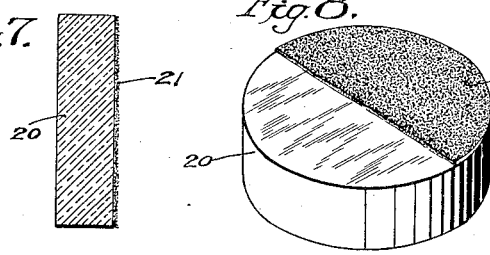
Inventor:—
George W. Hipsley
by his Attorneys
Howson & Howson Dec. 13, 1938.  G. W. HIPSLEY  2,140,229
INDICATING DEVICE FOR VEHICLE LIGHTS
Filed Feb. 5, 1935  3 Sheets—Sheet 2
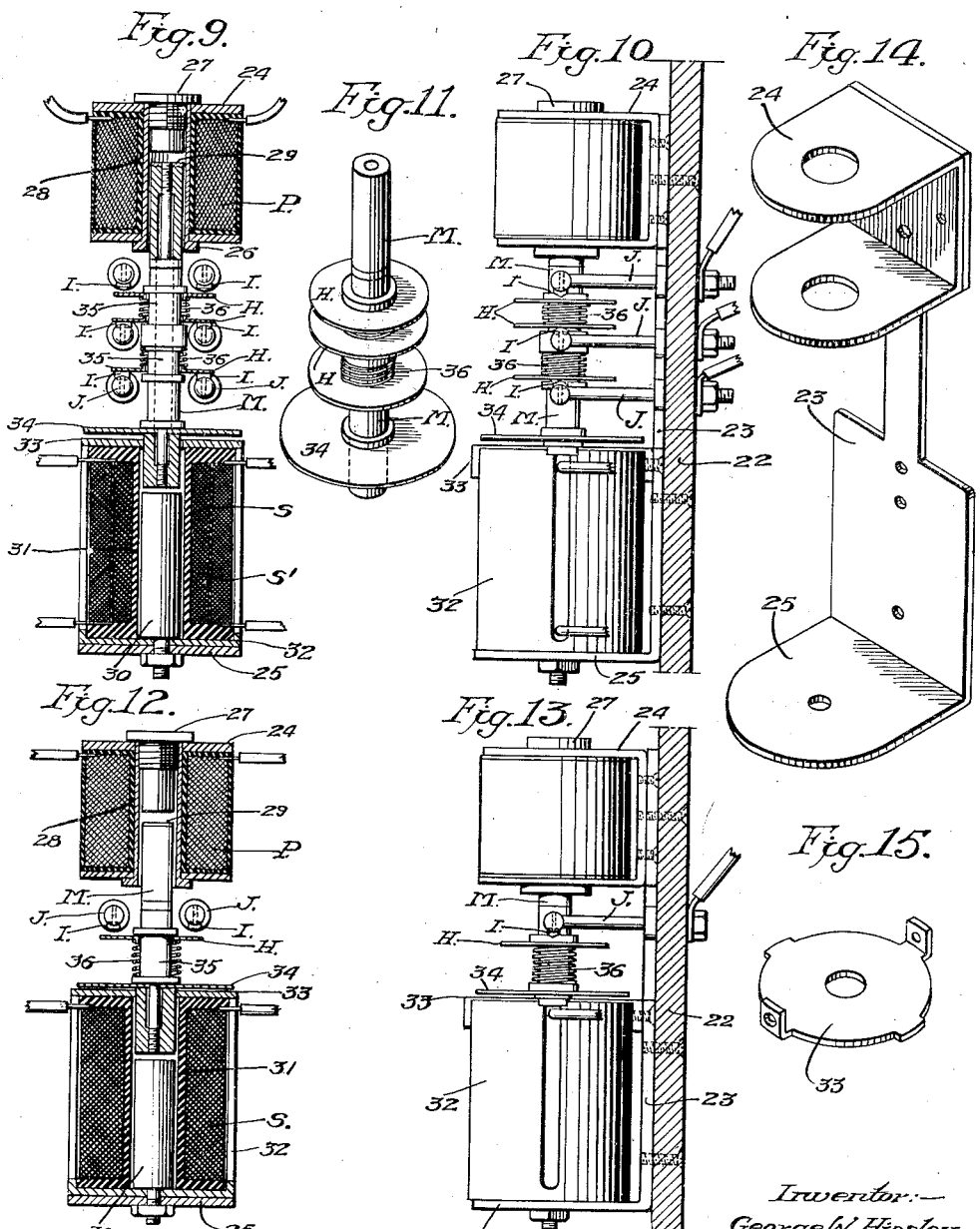

Dec. 13, 1938.  G. W. HIPSLEY  2,140,229
INDICATING DEVICE FOR VEHICLE LIGHTS
Filed Feb. 5, 1935  3 Sheets-Sheet 3

Inventor:—
George W. Hipsley
by his Attorneys
Howson & Howson

Patented Dec. 13, 1938

2,140,229

UNITED STATES PATENT OFFICE 2,140,229

INDICATING DEVICE FOR VEHICLE LIGHTS

George W. Hipsley, Philadelphia, Pa., assignor of ten one-hundredths to Juan G. Mathé, San Salvador, El Salvador Application February 5, 1935, Serial No. 5,141

3 Claims. (Cl. 177—327)

This invention relates to signal or indicator devices whereby certain conditions of electrical circuits at any particular time are clearly indicated, or whereby a distinctive signaling indication may be given when desired. The invention is directed particularly to automobile lighting systems but it is not limited thereto, being applicable in any analogous instance where it is desired to give a distinctive signaling indication for the purpose in view. The need for a device of this character in connection with automobile lighting circuits is well known. With the ever increasing number of automobiles using the roads and highways, the danger due to defective lighting apparatus is likewise increasing. It is quite common to see an automobile approaching with only one headlight lighted, and the operator or driver of a vehicle confronted by another vehicle thus defectively lighted is in extreme danger, particularly under adverse weather conditions or on an extremely dark night when he is unable to discern whether the approaching vehicle is an automobile or a motorcycle or, if it is an automobile, which of the headlights is lighted, and how much passage room he must give to the vehicle. This situation has been the cause of numerous accidents, many of them fatal. Likewise, an unlighted rear or tail light on a vehicle presents extreme danger of collision from the rear.

While some of the motor vehicle laws have strict requirements as to the lighting of vehicles, in most instances, the operator or driver of a vehicle which is defectively lighted does not know that this condition exists, particularly under certain weather conditions, such as heavy mist or fog when it is impossible to tell whether one or both of the headlights are lighted. Moreover, in any case, the operator usually has no way of knowing whether the rear or tail light of his vehicle is functioning properly. The same applies to the stop light which is now being used conventionally, and the danger of collision from the rear, due to a defective stop light, is comparable to the danger incident to a defective tail light.

The object of the present invention is to provide a practical and efficient device which is adapted to apprise the operator or driver of a vehicle at all times as to the exact condition or certain connections of his lighting system, and which will fulfill the urgent need for such a device, particularly in the field of automobile lighting.

Various devices have heretofore been proposed for the general object in view, which devices have attempted in a general way to accomplish the desired result but none of these devices have been entirely successful. Such devices have employed solenoids and electromagnets for controlling electrical circuits of the indicating device, arranged so that every time the lights of the vehicle are switched on or off or from bright to dim or vice versa, the contacts of the signalling device are either opened or closed, and the solenoids or electromagnets actuate their armatures against the force of springs or of gravity. Such devices usually include undue resistance in the lighting circuits. When it is considered that in the average case, the vehicle lights may be switched on or off several thousand times during a period of a year, and when it is further considered that the mechanical parts of such a device are necessarily of a delicate nature, that with this arrangement, it is quite evident the parts are subject to extreme wear and are very likely to get out of adjustment on these prior devices. Another difficulty with the devices of the prior art is their inability to indicate the condition or connection of all the principal lights of the lighting system.

By the present invention, the difficulties of the prior art devices are obviated, and various novel features are incorporated which greatly enhance the device both structurally and functionally. The invention may be clearly understood from the illustration of a preferred form of the device contained in the accompanying drawings.

In the drawings:

Fig. 1 is an elevation front view of the indicator assembly;

Fig. 2 is a sectional view taken along the line 2—2 of Fig. 1;

Figs. 3 and 4 illustrate the indications given by the indicators;

Fig. 5 is a sectional view taken along line 5—5 of Fig. 2;

Fig. 6 is a sectional view taken along the line 6—6 of Fig. 2;

Fig. 7 is a sectional view of one of the indicator view plates;

Fig. 8 is a perspective view of the same;

Fig. 9 is a sectional view of one of the electromagnetic contactors;

Fig. 10 is a side elevation of the same;

Fig. 11 is a perspective view of the armature assembly of the contactor;

Fig. 12 is a sectional view of another of the electromagnetic contactors;

Fig. 13 is a side elevation of the same;

Fig. 14 is a perspective view of an assembly yoke of one of the contactors;

Fig. 15 is a perspective view of a non-magnetic spacer of the series magnets.

Figure 16:
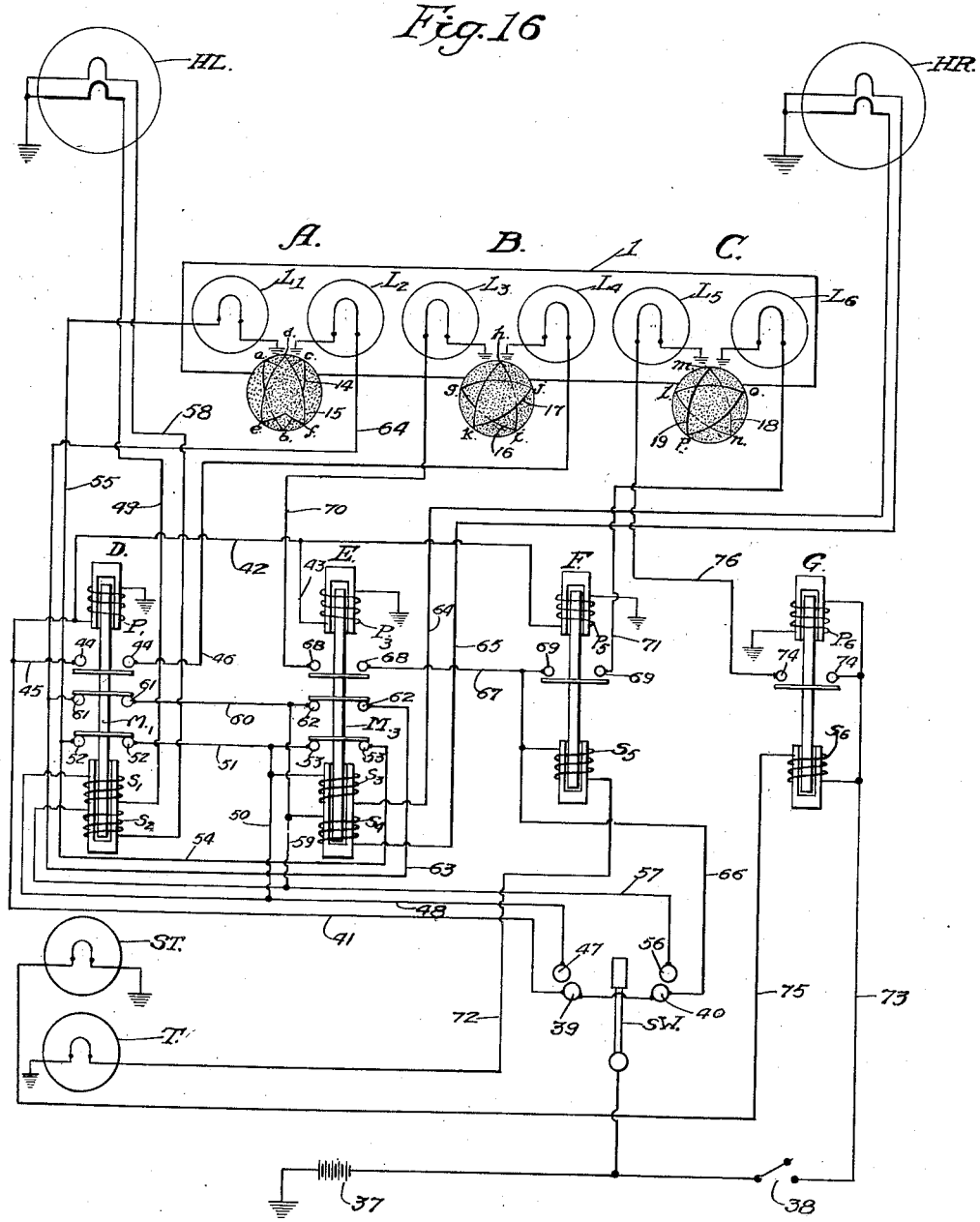
Fig. 16 is a schematic wiring diagram of the device.

Referring particularly to Figs. 1 and 2, the device comprises an indicator assembly 1 which may be mounted in any convenient position that is clearly visible to the operator of the vehicle. For example, the indicator may be mounted on the instrument panel or at some other convenient place in the driver's compartment of the vehicle in such position that the operator of the vehicle will be cognizant at all times of the immediate indication of one or more lamp failures, or the indicator may be mounted above the windshield or in any other convenient location where it will be clearly visible. The indicator, as shown in this application, comprises three similar sections A, B and C, but it is to be understood that this is a preferred embodiment and that the device is not limited to this arrangement and that other arrangements are possible within the scope of the invention. As will be more clearly explained hereinafter, the purpose of section A is to indicate whether the headlights are bright or dim, or whether their beams are elevated or lowered. The purpose of section B is to indicate failure of one or both of the headlights, such indication being given whether the lights are bright or dim and the purpose of section C is to indicate failure of either the tail or stop light or lights.

As shown in Fig. 2, the indicator assembly takes the form of a box-like container which may be formed of metal or any suitable material. The front face of the indicator is provided with indicating windows 2, one for each of the said sections. Each of the windows comprises a view plate 3, which may be formed of glass, or like material, projecting outwardly from the front face of the indicator container or cabinet. These view plates constitute image flields, as will be seen later. The device may be mounted upon any suitable supporting panel 4 with the view plates 3 extending through apertures in the said panel, as shown clearly in Fig. 2.

Each of the sections A, B, and C comprises a pair of compartments or chambers 5 and 6 within which are positioned indicating lamps $L_1$ to $L_6$, inclusive. The rear wall or walls of the container may be hinged, as shown in Fig. 5, to permit lamp replacement. Excepting for difference in image projection, which will be described hereinafter, the three sections are constructed identically, and the same description, therefore, applies to all of them. The compartments 5 and 6 are defined by parallel vertical walls as shown, the two compartments being separated by the wall 7 and by oblique walls 8 and 9 extending from the wall 7 to the front of the cabinet or container as illustrated. The walls 8 and 9 are provided with distinctively shaped apertures 10 and 11, respectively, (see Figs. 5 and 6) and these apertures may be covered by transparent members 12 and 13 which may be formed of colored glass or other suitable material. The inside surfaces of the other walls forming the compartments 5 and 6 may be rendered substantially nonreflecting in any suitable manner, for example, by painting these surfaces with dull black paint so that substantially all of the light passing through the apertures 10 and 11 from the lamps is direct. It will be seen that the device is designed to function without the need of projection lenses or reflectors, the focusing or image formation being accomplished by the distinctively shaped openings 10 and 11 and the lamps $L_1$ to $L_6$, which should have their filaments accurately centered and aligned, as in the modern precision headlight lamps. The obviation of lenses and reflectors adds greatly to the simplicity and the practicability of the device.

The purpose of the distinctively shaped apertures or openings 10 and 11 is to form on the view plates 3 indications having specific meanings. In section A, the opening 10, which passes light from the lamp $L_1$, is designed so as to form on the view plate, the arrow-head image 15 (see Fig. 3) which points upward and which is defined by the points $d, e, f$. The plate 12 of this section is preferably blue so that the image 15 is blue. The opening or aperture 11, on the other hand, is adapted to form by the passage of light from lamp $L_2$, the downwardly pointing arrow-head image 14, which is defined by the points $a, b, c$. The plate 13 is preferably colored green so that the image 14 is green. As will be more clearly understood hereinafter, only one of these images is formed at one time, the downwardly pointing image 14 indicating the downward position of the headlight beams or the dim operation of the headlights, while the upwardly pointing image 15 indicates the elevated position of the headlight beams or the bright operation of the headlights. It is, therefore, possible to have a common field for these two images, as illustrated.

The opening or aperture 10 of section B is of such shape or configuration that it causes the projection of an image 16 (see Fig. 4) by the light from lamp $L_3$. This image, which is defined by the points $g, h, i$, points downwardly and toward the right. The plate 12 of this section is preferably colored amber so that the image 16 is amber. When this image is formed, it indicates that the right hand headlight has ceased to function, as will be more fully understood hereinafter. The opening 11 of section B is of such shape that it causes the formation of an image 17 from the light projected by lamp $L_4$. This image, which is defined by points $h, j, k$ also points downwardly but toward the left, indicating failure of the left hand headlight. The plate 13 is preferably colored red so that the image 17 is red. The openings 10 and 11 of section C (see Figs. 5 and 6) are similar respectively to the corresponding openings of section B and cause the formation of similar images, as shown in Fig. 16. In this case, however, the image pointing toward the left, formed by light from lamp $L_6$, indicates failure of the tail light or lights, while the image pointing toward the right, formed by light from lamp $L_5$, indicates failure of the stop light or lights. These images are shown in the diagrammatic illustration of Fig. 16, the image pointing toward the right being designated 18 and being defined by the points $l, m, n$, and the image pointing toward the left being designated 19 and being defined by points $m, o, p$. The plate 12 of this section is also preferably colored amber so that the image 18 is amber. The plate 13 is preferably colored red so that the image 19 is red.

It should be noted that the preferred color scheme has been designedly chosen. Referring to section A, the images 14 and 15, which are formed during normal operation, have been given relatively soft colors, while the images of sections B and C have been given bright or harsh colors, since they indicate abnormal conditions. Moreover, the images which indicate failure of the left hand headlight and failure of the tail light have been assigned the color red because these are the most dangerous conditions. It is to be understood that while I have described a preferred color arrangement, other combinations of colors and distinctly shaped light images may be employed without departing from the spirit of the invention.

Since the light from the indicator lamps strikes the image fields or view plates 3 at an angle, there was presented the problem of obtaining clearly defined images which would be clearly visible from any point of vision within the car. This required special design of the indicator view plate members 3, because the standard or known types of glass or like materials were incapable of solving the problem. While a person standing directly in line with the light from an indicator lamp could plainly see the image thrown upon the view plate, the image would gradually disappear as the observer shifted his position, thus varying the angle of vision.

To meet this difficulty, there is provided by this invention a special composite view plate member which is illustrated more clearly in Figs. 7 and 8. This view plate, which has been designated by reference character 3, comprises a piece of ordinary clear white glass 20 of any desired thickness within practical limits, and a coating 21 of powdered glass applied to the rear surface of the glass piece 20 by means of cement, lacquer, or in any other suitable manner. Preferably, this coating is prepared by grinding or crushing to powdered form conventional clear white glass such as is used to make cut-glass articles. The thickness of this coating may also be varied within the limits of practicability. It has been found that when this special composite view plate is used and the light impinges upon it and forms an image, as above described, the image can be seen plainly by the operator or other occupant of a vehicle from any practical location within the car. The coating 21 causes the formation of a definite image which is of substantially constant luminosity regardless of the point of observation or the angle of vision of a person within the car. This is apparently due to prismatic action of the fine particles of glass of which the coating is composed which seem to concentrate the light rays and fix them in position. Moreover, the coating gives a brilliant sparkle to the image and makes it stand out so that it is more effective in attracting the attention of the operator or in keeping him conscious of the vehicle lighting condition existing at any particular time. It will be seen that this is a very important feature of the invention as it greatly enhances the utility of the device and makes it much more practical.

The invention further comprises two types of specially designed electromagnetic contactors, the mechanical structures of which are illustrated in Figs. 9 to 15. These contactors are shown at D, E, F, and G on the schematic diagram of Fig. 16 and their electrical operation and control functions will be described hereinafter with reference to that figure. Referring first to Figs. 9 to 10, the electromagnetic contactor therein disclosed comprises essentially an upper coil P which, due to its manner of electrical connection, may be called a parallel or shunt coil or winding. The contactor also comprises concentrically wound lower coils S and S' which are series coils or windings arranged in opposition to the shunt coil P. An armature assembly M is arranged for actuation by the upper and lower electromagnetic structures in the manner which will be particularly described hereinafter. The armature carries a plurality of contact disks H which are arranged for cooperation with stationary contacts I and carried by studs J.

The contactor assembly may be mounted upon a suitable supporting panel 22, as shown clearly in Fig. 10. A non-magnetic yoke 23 (see Fig. 14) serves as a support for the contactor magnet elements and greatly assists and facilitates the assembly and accurate adjustment of the said parts. This yoke may be formed of brass or other non-magnetic material and it may be shaped as illustrated and provided with apertures through which attachment screws may extend. It will be seen that this yoke lends itself nicely to use as a template or gauge in the accurate drilling of the supporting panel. A U-shaped shell 24 formed of magnetic metal may be secured to the upper part of yoke 23 as illustrated. This shell serves to seat the coil P and it also forms a part of the magnetic structure associated with that coil. The transversely extending lower portion 25 of yoke 23 serves to seat the lower coil assembly.

Referring to the upper coil assembly, a non-magnetic sleeve 26 extends through the openings in the parallel portions of shell 24. A magnetic pole piece 27 extends into and threadedly engages the sleeve 26. An insulating spool 28 surrounds the said sleeve and supports the winding P. The upper end of the movable armature extends into the sleeve, as illustrated, and it will be seen that a magnetic circuit is provided comprising the pole piece 27, the shell 24, and the upper movable armature pole piece. A non-magnetic spacer 29 is provided to prevent residual magnetism from holding the armature in its uppermost position after current has ceased to flow through coil P. The thickness of this spacer also determines the force necessary for the lower magnet to pull the armature downward against the pull of the coil P.

Referring to the lower coil assembly, a pole piece 30 is secured to the bottom seating portion 25 of yoke 23 and extends within the insulating spool 31 upon which the coils S and S' are wound. The shunt magnet windings on all the contactors are practically identical, while the series windings are designed for the bulbs to which they are connected. A magnetic shell 32 surrounds the coil structure and is also secured to the seat portion 25. The lower movable armature pole piece extends into the structure as clearly shown in Fig. 9, and a magnetic circuit is provided through the magnet pole piece 30, the magnetic shell 32, and the armature pole piece and disc 34. A non-magnetic spacer 33 (see Fig. 15) serves to guide the armature spindle and prevents the residual magnetism from holding the armature down when a lamp has failed. The armature carries the magnetic disk 34 which is acted upon by the magnetic shell 32 and serves to complete the magnetic circuit. The design of the electromagnetic structures is such that either of the series coils S or S', when energized, exerts a pulling force on the armature which with the force of gravity resists the pull of the shunt coil P, although the latter is sufficient to overcome the force of gravity alone.

The studs J extend through the supporting panel 22 and are secured rigidly, the ends of the studs serving as terminals for electrical conductors, as shown clearly in Fig. 10. The armature disks H are floatingly mounted upon insulating sleeves 35 under the influence of coil springs 36. As shown clearly in Fig. 10, the stationary contacts I are slightly off-center with respect to the disks H. The contacts are rounded or are substantially V-shaped so that the disks wobble or rotate slightly, when they engage the stationary contacts, under the influence of the springs 36. In other words, when the armature is actuated, the contact disks are brought into initial contact with the stationary contacts and until then the springs play no part other than to hold the discs rigid. At such time, however, the springs, in conjunction with the armature movement, effect a slight wobbling of the disks as they seat against the contacts and this gives a wiping contact action. This action not only serves to make the contact more effective but it also keeps the contacting surfaces clean. Furthermore, the initial contact of the disks and the stationary contact members is rapid and positive so that the circuits are made and broken quickly and arcing with its deleterious effects is substantially eliminated.

The contactor shown in Figs. 12 and 13 is generally the same as that above described and the corresponding parts have been designated accordingly. In this case, however, there is a single lower coil S and only one pair of the stationary contacts I and only one armature disk H. Otherwise, the structure is substantially the same as that of the above-described contactor and it is, therefore, unnecessary to further describe this device.

Referring now to the diagrammatic illustration of Fig. 16, the invention is there illustrated in its application to a complete automobile lighting system. The two headlights are shown at HL and HR. Each of these headlights is of conventional form with bright and dim filaments arranged to give different elevations of the light beams, the bright filament being indicated by a relatively heavy line illustration. The tail light of the vehicle is shown at T and the stop light is shown at ST. The light switch is shown at SW. This switch is a two-position switch arranged for bright and dim operation of the headlights. When the switch is thrown to the left, the headlights are operated brightly with the light beams in upper position, while in the right hand position of the switch SW, the headlights are operated dimly with the light beams in lower position. The usual battery, which supplies the lighting current, is shown at 37, while the usual stop light switch is shown at 38. It will be understood that this switch is operated when the vehicle brake is applied as is customary.

The contactors D and E are of the type illustrated in Figs. 9 and 10, while the contactors F and G are of the type illustrated in Figs. 12 and 13. The ungrounded terminal of battery 37 is connected to the movable member of switch SW. The stationary contacts, 39 and 40 of the switch are connected together as illustrated. Contact 39 is connected by a conductor 41 to one extremity of the shunt winding $P_1$ and to the corresponding extremity of the windings $P_3$ and $P_5$ via branch conductors 42 and 43. The other extremity of each of these windings is grounded as illustrated. The contact 39 is also connected to one of the upper contacts 44 of contactor D via branch conductor 45. The other of the contacts 44 is connected via conductor 46 to lamp $L_4$.

The contact 47 of switch SW is connected via conductor 48 to one extremity of winding $S_1$ of the contactor D, the other extremity of this winding being connected via conductor 49 to the bright filament of the headlight HL. The contact 47 is also connected via the branch conductor 50 to one extremity of winding $S_3$ and also via branch conductor 51 to one of the contacts 52 of contactor D and to one of the contacts 53 of contactor E. The others of these pairs of contacts are connected together via conductor 54. The lamp $L_1$ is connected to these contacts by conductor 55.

Contact 56 of switch SW is connected via conductor 57 to one extremity of winding $S_2$ of contactor D, the other extremity of this winding being connected via conductor 58 to the dim filament of headlight HL. The contact 56 is also connected via branch conductor 59 to one extremity of winding $S_4$ of contactor E and also via branch conductor 60 to one of the stationary contacts 61 of contactor D and to one of the stationary contacts 62 of contactor E. The others of these pairs of contacts are connected together via conductor 63. The lamp $L_2$ is connected to these contacts by conductor 64. The other extremities of windings $S_3$ and $S_4$ are connected respectively via conductors 64 and 65 to the bright and dim filaments of headlight HR.

Contact 40 of switch SW is connected via conductor 66 to one extremity of winding $S_5$ of contactor F and also via branch conductor 67 to one of the contacts 68 of contactor E and to one of the contacts 69 of contactor F. Lamp $L_3$ is connected to the other contact 68 by conductor 70. Lamp $L_6$ is connected to the other contact 69 by conductor 71. The other extremity of winding $S_5$ is connected via conductor 72 to the tail light T.

The battery 37 is connected via stop switch 38 and conductor 73 to one extremity of each of the windings $P_6$ and $S_6$ of contactor G and also to one of the contacts 74 of that contactor. The other extremity of winding $P_6$ is grounded, as illustrated, while the other extremity of winding $S_6$ is connected to the stop light ST by conductor 75. The lamp $L_5$ is connected to the other contact 74 by conductor 76.

The operation of the device is as follows:—
Assume that switch SW is thrown to the left hand position to give bright operation of the headlights, the ungrounded side of the battery will then be applied to both the switch contacts 39 and 47. A circuit will be completed through contact 39, conductor 41 through winding $P_1$ of contactor D and also through the corresponding shunt windings $P_3$ and $P_5$ of contactors E and F via conductors 42 and 43. The shunt windings of these three contactors will, therefore, be energized. At the same time, a circuit is completed through contact 47, conductor 48, winding $S_1$ of contactor D, conductor 49 and the bright filament of the headlight HL. The winding $S_1$ is, therefore, in series with the headlight filament and as long as the filament is not defective, this winding will be energized and will overcome the pull of the shunt winding $P_1$.

A circuit is also completed through conductor 50, winding $S_3$ of contactor E, conductor 64 and the bright filament of headlight HR. The energized winding $S_3$ functions in the same manner with respect to the headlight HR as just described. A circuit is also completed through conductor 51, the parallel branch circuits across the closed contacts 52 and 53 of contactors D and E, conductor 55 and indicator lamp $L_1$. The light from this lamp causes the projection on the indicator window of section A of the upwardly pointing image 15, as above described, indicating that the headlights are operating brightly. As long as both of the headlights operate properly, this indication will be given. Suppose, however, that the bright filament of headlight HL should burn out, this would interrupt the circuit of winding $S_1$ of contactor D and would allow the energized shunt winding $P_1$ to pull the armature of the contactor upward, thereby opening the circuit across contacts 52 and completing the circuit of lamp $L_4$ as follows:—through switch SW, conductor 41, conductor 45 across closed contacts 44 of contactor D, conductor 46, and lamp $L_4$. This would cause the projection of the image 17 upon the view plate or window of section B, indicating that the left hand headlight had ceased to function.

Should the bright filament of headlight HR fail, the winding $S_3$ of contactor E would be de-energized and the shunt winding $P_3$ would pull the armature upward. This would open the circuit across contacts 53 and complete the circuit of lamp $L_3$ as follows:—through contacts 39 and 40 of switch SW, conductor 66, conductor 67, across closed contacts 68 of contactor E, conductor 70, and lamp $L_3$. This would cause the formation of image 16 which points toward the right and indicates failure of the right hand headlight.

If the switch SW is thrown to the right, the circuits of the dim filaments of the two headlights will be completed through the series coils $S_2$ and $S_4$ of contactors D and E, which circuits may be readily traced from the above description. At the same time, the shunt windings $P_1$, $P_3$ and $P_5$ will be energized by virtue of the connection between contacts 39 and 40 of switch SW. The lamp $L_2$ will now be energized by the circuit including contacts 40 and 56 of switch SW, conductor 57, conductor 59, conductor 60, the parallel branch circuits across closed contacts 61 and 62 of the contactor D and E, conductor 64, and lamp $L_2$. This will cause the formation of the downwardly pointing image 14 on the view plate or window of section A, indicating dim operation of the headlights. Should either of the dim filaments of the headlights fail, the corresponding series coil $S_2$ or $S_4$ will be de-energized, allowing the contactor to operate and cause operation of either of the lamps $L_3$ or $L_4$ in the manner above described.

If both headlights should fail, then contactors D and E would function at the same time, opening the circuit at 52, 53, or 61, 62, depending upon whether the headlights are on bright or dim, thus extinguishing the lamp $L_1$ or $L_2$. At the same time, contacts 44 and 68 would be closed, simultaneously lighting the lamps $L_3$ and $L_4$, which form a star-shaped image upon indicator B. The object of the two lower contact discs with their corresponding fixed contacts on the contactors D and E is to extinguish the lamp $L_1$ or $L_2$ in case both headlights should fail, which together with the star-shaped image upon indicator B, gives a positive indication. When only one contactor functions, there is still a circuit for lamp $L_1$ or $L_2$ across the closed contacts of the other contactor, but when both contactors function at the same time, the signalling circuit is naturally opened, extinguishing the lamp $L_1$ or $L_2$ according to whether the headlights are on bright or dim. This arrangement is very desirable but not absolutely necessary, as without it the device would still give a complete indication of lamp failures, the only difference being that in case of a failure of both headlights, the image on indicator A would not be extinguished. So if necessary, for reasons of economy, these contacts could be eliminated, then all the electromagnetic contactors would function with only one contactor disc H.

In either position of switch SW, the tail light T will be energized through the circuit including conductor 66, series winding $S_5$ of contactor F, conductor 72, and the tail light T. This will serve to maintain the contacts of contactor F open until such time as the tail light should fail, when the shunt winding $P_5$ will then be enabled to pull the armature upward and close the contacts, completing a circuit through conductor 66 across the contacts 69, conductor 71, and lamp $L_6$. This will cause the formation of the image 19 on the view plate or window of section C, thereby indicating failure of the tail light.

Independently of the switch SW, the stop light is energized whenever the brake-operated switch 38 is closed through the circuit including conductor 73, series winding $S_6$ of contactor G, conductor 75, and the stop light ST. At the same time, the shunt winding $P_6$ of the contactor will be energized in an obvious manner. The contactor will not be actuated due to the electromagnetic pull of the series winding. Should the stop light fail, then the shunt winding will be enabled to raise the armature, closing contacts 74 and completing a circuit through conductor 76 and lamp $L_5$. This will cause the formation of the image 18 on the view plate or window of section C, indicating failure of the stop light.

By disregarding the prior use of springs as a necessary part of the device to actuate the signal contacts, and in place of them using shunt magnets, I have been able to design an electromagnetic contactor with two independent circuits, having two unequal forces pulling in opposite directions. The series magnet being at the bottom and always the stronger of the two forces, the moving armature is always held in this position as long as there is current flowing in the series coil. If a filament should fail, the circuit through the series coil would naturally be broken, de-magnetizing the lower magnet and allowing the shunt magnet to pull the armature up, thereby closing the proper signalling circuits, and under certain conditions the opening of others.

On the electromagnetic contactors D and E, the springs of the contactor discs tend to hold up the armature about a thirty-second of an inch from the bottom magnet, and when the lights are on the armature is pulled down, tightening said contacts. Inasmuch as there are no contacts opened or closed, (this slight movement serving only to tighten and hold firmly closed the contacts that were already in contact, and preventing the movement of the car from interfering with their function) for all practical purposes it can truthfully be said that there are no moving parts except when one or more lamps have failed; and as gravity holds the armatures down when there is no current flowing in the device, and as both shunt magnets and series magnets are energized at the same time, the series magnets being strongest, tends to hold the armatures firmly which were already in contact with the lower magnets, the result is that normally no parts are moved. When the main switch is opened, both shunt and series magnets are de-energized at the same time, and for the same reason there are no moving parts. With this arrangement the device can be very accurately adjusted at the factory, with the likely assurance that it will never need further adjustment for the life of the car, inasmuch as it functions only when there is trouble; and it is very unlikely that there will be enough lamp failures to affect the efficient operation of the contactors.

This is a very important feature as it eliminates the operation of moving parts during normal operation. Under these conditions, the number of operations of the contactors will not be such as to cause appreciable wear of the parts or to cause them to become improperly adjusted throughout substantially the entire life of the device and the automobile upon which it is used. Furthermore, normally only two of the indicator lamps, viz. $L_1$ and $L_2$, are operated. The other lamps which are the most important ones, inasmuch as they indicate a defective condition of the lighting system, will very rarely need replacement, if ever, in view of their infrequent operation. Also the lamps $L_1$ and $L_2$, due to their intermittent or alternative operation, will seldom need replacement. The amount of current consumed by the energization of the contactor windings is very small. In fact, it has been determined from an actual operating device constructed as herein illustrated and described that not more than ½ ampere of current is consumed by the electromagnets and indicator lamp during normal operation, using standard 3 C. P. bulbs.

My arrangement of the indicator assembly is both novel and practical, and with it I have been able to give a complete and accurate indication of all the principal lights in the lighting system, without using a multitude of complicated and unnecessary parts. The three indicators A—B—C perform eight distinct functions; namely, A indicates if the headlights are on bright or dim; B indicates a failure of one or both headlights, and functions whether the lights be on bright or dim; C indicates a failure of one or both tail lights, and one or both stop lights.

It will be obvious that the device may be readily adapted to give audible indications either alone or in addition to the visible indications. For example, by including electrically operable audible signal devices, such as bells or buzzers, in the circuits of the lamps $L_3$ to $L_6$, an audible indication will be given whenever a defective condition exists. If desired, the audible signal devices could be arranged to give different tones or sound intensities or different conditions. Also, the audible signal devices could be used in place of the lamps $L_3$ to $L_6$. Other arrangements will occur to those skilled in the art.

It will be seen that the device is designed to indicate every possible failure of the principal lamps of the lighting system and that it is relatively simple when viewed in the light of the functions that it performs. Moreover, its design is such that it has many advantages and desirable features. Although the device is preferably constructed substantially as herein disclosed, it will be apparent that various changes and modifications may be made without departing from the spirit and scope of the invention.

I claim:

1. In a vehicle attachment adapted for installation in the driver's compartment of the vehicle for visually indicating to an occupant of said vehicle the condition of the vehicle lights, an indicator comprising a casing divided into a plurality of individual compartments; a common image field for each compartment; a plurality of electric light bulbs mounted in each compartment behind the common image field thereof; and a plurality of partitions in each compartment, one of said partitions positioned between each electric light bulb in each compartment and the common image field associated with that particular compartment and each of said partitions having a distinctively shaped aperture; the light rays from each energized electric light bulb passing through the aperture in the partition associated with said bulb and forming on the common image field of the compartment in which the energized bulb is located a distinctively shaped light image visible to an occupant of the vehicle to indicate to said occupant the exact condition of said vehicle lights.

2. A vehicle attachment adapted for installation in the driver's compartment of the vehicle for visibly indicating to an occupant of said vehicle the energization of certain filaments of the vehicle headlights, comprising an image field readily visible to an occupant of said vehicle; means for forming on said image field a distinctively colored light image indicative of the energization of one set of filaments of said headlights; and means for forming on the said image field another distinctively colored light image indicative of the energization of another set of filaments of said headlights, said image field serving as a common image field for the separately formed light images.

3. A vehicle attachment adapted for installation in the driver's compartment of the vehicle for visibly indicating to an occupant of said vehicle the energization of the filaments of vehicle headlights each having "bright" and "dim" filaments therein, comprising a first image field readily visible to an occupant of said vehicle; means for forming on said image field a distinctive light image indicative of the energization of the "bright" filaments of both of said headlights; means for forming on said image field a distinctive light image indicative of the energization of the "dim" filaments of both of said headlights; a second image field on said attachment and readily visible to an occupant of said vehicle; and means for forming on said second image field a distinctive light image indicative of the failure of the filaments of one or both of said headlights, said second image field adapted to function cooperatively with said first image field to indicate to the occupant of the vehicle the failure of one or both "bright" filaments when said first image field is indicating the energization of the "bright" filaments of both of the headlights and adapted to function cooperatively with said first image field to indicate the failure of one or both "dim" filaments when said first image field is indicating the energization of the "dim" filaments of both of said headlights.

GEORGE W. HIPSLEY.